US008866735B2

(12) United States Patent
Zhao et al.

(10) Patent No.: US 8,866,735 B2
(45) Date of Patent: Oct. 21, 2014

(54) METHOD AND APPARATUS FOR ACTIVATING A FUNCTION OF AN ELECTRONIC DEVICE

(75) Inventors: Hong Zhao, Naperville, IL (US); Michael F. Olley, Lake Zurich, IL (US); Mark F. Valentine, Kenosha, WI (US)

(73) Assignee: Motorla Mobility LLC, Libertyville, IL (US)

(*) Notice: Subject to any disclaimer, the term of this patent is extended or adjusted under 35 U.S.C. 154(b) by 774 days.

(21) Appl. No.: 12/970,763

(22) Filed: Dec. 16, 2010

(65) Prior Publication Data

US 2012/0154292 A1    Jun. 21, 2012

(51) Int. Cl.
  G09G 5/00     (2006.01)
  G06F 3/01     (2006.01)
  G06F 1/16     (2006.01)
  G06F 3/0488   (2013.01)
  H04M 1/725    (2006.01)

(52) U.S. Cl.
  CPC .............. *G06F 3/017* (2013.01); *G06F 1/1626* (2013.01); *G06F 1/1694* (2013.01); *G06F 3/0488* (2013.01); *H04M 1/72563* (2013.01); *H04M 2250/12* (2013.01)
  USPC ........... 345/156; 345/158; 345/204; 348/155; 713/320; 713/300; 715/863

(58) Field of Classification Search
  USPC ........... 345/156, 158, 204; 348/155; 713/320, 713/300; 715/863
  See application file for complete search history.

(56) References Cited

U.S. PATENT DOCUMENTS

| 7,479,949 | B2 | 1/2009 | Jobs et al. |
| 7,519,918 | B2* | 4/2009 | Trantow ........................ 715/778 |
| 7,606,552 | B2 | 10/2009 | Orr et al. |
| 7,791,588 | B2* | 9/2010 | Tierling et al. ............... 345/156 |
| 2005/0078093 | A1 | 4/2005 | Peterson, Jr. et al. |
| 2008/0118152 | A1 | 5/2008 | Thorn et al. |
| 2009/0265671 | A1 | 10/2009 | Sachs et al. |
| 2010/0194682 | A1 | 8/2010 | Orr et al. |

(Continued)

FOREIGN PATENT DOCUMENTS

| EP | 2341417 A1 | 7/2011 |
| WO | 2009105821 A1 | 9/2009 |
| WO | 2010047932 A1 | 4/2010 |
| WO | 2010114841 A1 | 10/2010 |

OTHER PUBLICATIONS

Zhao et al., "Method for Detecting False Wake Conditions of a Portable Electronic Device" U.S. Appl. No. 13/251,632, filed Oct. 3, 2011, 24 pages.

(Continued)

*Primary Examiner* — Shaheda Abdin
(74) *Attorney, Agent, or Firm* — Shumaker & Sieffert, P.A.

(57) ABSTRACT

A method and apparatus for activating a function of the electronic device is disclosed herewith. The method includes detecting a first input by a motion sensor. Further, the method activates a touch sensor of the electronic device in response to detecting the first input. The method then detects a second input by the motion sensor within a predetermined time period from the first input. Next, the method determines, in response to detecting the second input, whether contact has occurred at the touch sensor and activates a function of the electronic device in response to determining that contact has occurred at the touch sensor when the second input is detected.

16 Claims, 3 Drawing Sheets

(56) References Cited

U.S. PATENT DOCUMENTS

2010/0201615 A1 8/2010 Tupman et al.
2010/0256947 A1 10/2010 Kim et al.
2010/0321321 A1 12/2010 Shenfield et al.

OTHER PUBLICATIONS

Patent Cooperation Treaty, "PCT Search Report and Written Opinion of the International Searching Authority" for International Application No. PCT/US2012/054562 dated Nov. 22, 2012, 12 pages.

Patent Cooperation Treaty, "PCT Search Report and Written Opinion of the International Searching Authority" for International Application No. PCT/US2011/061602 Mar. 7, 2012, 14 pages.

Ronkainen et al., "Tap Input as an Embedded Interaction Method for Mobile Devices" Proceedings of the 1st International Conference on Tangible and Embedded Interaction, Jan. 1, 2007, p. 263.

International Preliminary Report on Patentability from international application No. PCT/US2011/061602, dated Jun. 18, 2013, 8 pp.

Communication pursuant to Rules 161(1) and 162 EPC from European counterpart application No. 11794300.1, dated Aug. 2, 2013, 2 pp.

Response to Communication pursuant to Rules 161(1) and 162 EPC dated Aug. 2, 2013, from European counterpart application No. 11794300.1, filed Feb. 12, 2014, 3 pp.

* cited by examiner

METHOD AND APPARATUS FOR ACTIVATING A FUNCTION OF AN ELECTRONIC DEVICE

FIELD OF THE DISCLOSURE

The present disclosure relates generally to an electronic device and more particularly to a method and apparatus for activating a function of the electronic device on effectively detecting a double tap by the sensors of the device.

BACKGROUND

Electronic devices, including mobile phones and other portable devices, are increasingly being upgraded with improvised applications and functionalities. For example, a mobile phone may include a touch-sensitive screen that enables one to interact directly with what is displayed, rather than indirectly with a cursor controlled by a mouse or a touchpad. The touch-sensitive screen can sense fingers, hands, and passive devices such as stylus. Thus, the touch-sensitive screen can be used to activate a function of the electronic device.

In the present systems, activating a function of the electronic devices by a double tap using an accelerometer has been proposed for many mobile phones. However, in existing conventional systems, extensive studies in feature prototype have shown that it is extremely difficult to achieve low falsing in certain cases, such as, while the mobile phone is in pocket, car cradle, etc. In other words, falsing is hard to overcome in certain cases, for example, in the car cradle, because the accelerometer alone cannot distinguish finger tap and periodic motion generated from a rough road.

Accordingly, there is a need for a method and apparatus for activating a function of the electronic device on detecting a real double tap and thus avoiding falsing.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
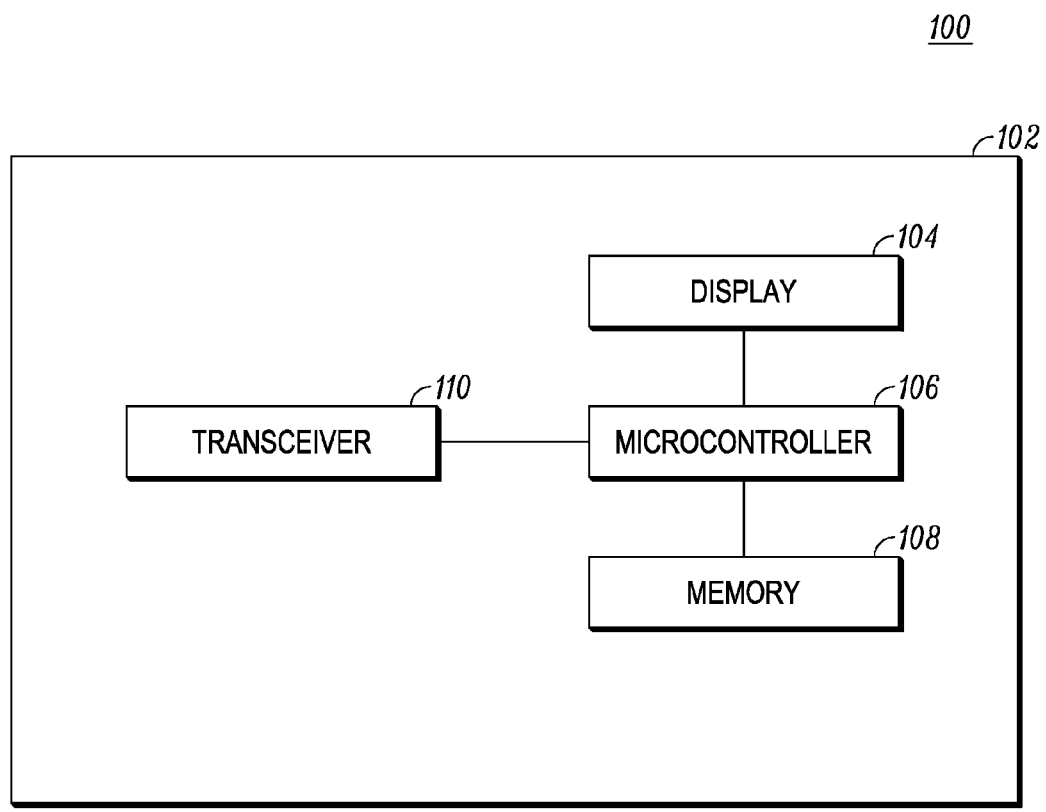
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before describing in detail the particular method and system for activating a function of an electronic device, in accordance with an embodiment of the present disclosure, it should be observed that the present disclosure resides primarily in combinations of method steps and apparatus components related to the method and system for activating the function of the electronic device. Accordingly, the apparatus components and method steps have been represented where appropriate by conventional symbols in the drawings, showing only those specific details that are pertinent to understanding the present disclosure, so as not to obscure the disclosure with details that will be readily apparent to those of ordinary skill in the art, having the benefit of the description herein.

An electronic device and a method of activating a function of the electronic device are disclosed herewith. The method includes detecting a first input by a motion sensor. Further, the method activates a touch sensor of the electronic device in response to detecting the first input. The method then detects a second input by the motion sensor within a predetermined time period from the first input. Next, the method determines, in response to detecting the second input, whether contact has occurred at the touch sensor and activates a function of the electronic device in response to determining that contact has occurred at the touch sensor when the second input is detected.

FIG. 1 is a block diagram 100 of an electronic device 102 in accordance with an embodiment. The depicted electronic device 102 may be implemented as a mobile device, such as a cellular or mobile phone, which represents a wide variety of devices that have been developed for use within various communication networks. Although the electronic device is shown as a wireless communication device, the electronic device 102 may be a cellular telephone, a messaging device, a mobile data terminal, a computer (laptop, desktop, handheld, etc.), a personal digital assistant (with or without a wireless connection), a gaming console, or a wide variety of electronic devices with graphical user interfaces and physical buttons/keys. Any of these portable devices may be referred to as a mobile station, user equipment, or the like.

The block diagram 100 of the electronic device 102 includes various components. The exemplary components includes a display 104, a microcontroller 106, a memory 108, and one or more transceivers 110 which may be capable of receiving signals from multiple antennas and from various networks. In accordance with the embodiment, the display 104 is coupled to the microcontroller 106. The display 104 is a touch-sensitive display. The display 104 may display various images or objects, such as a set of icons.

In accordance with the embodiment, the microcontroller 106 may be coupled to the transceiver 110, the memory 108, and the display 104. However, it is to be understood that one or more of these components may be combined or integrated in a common component, or a components features may be distributed among multiple components. Also, the components of the electronic device 102 may be connected differently, such as bypassing the microcontroller, without departing from the scope of the invention. The microcontroller 106 operates in conjunction with the data and instructions stored in the memory 108 to control the operation of the electronic device 102. The microcontroller 106 may be implemented as a processor, a digital signal processor, hard-wired logic and analog circuitry, or any suitable combination of these.

In accordance with the embodiment, the memory 108 is coupled to the microcontroller 108 to store data and instructions for the operation of the microcontroller 106. In one embodiment, the memory 108 includes buffers for storing data. In the various embodiments, the memory 108 may be one or more separate components and/or may be partitioned in various ways for various purposes such as but not limited to, optimizing memory allocations, etc. Thus it is to be understood that the exemplary memory 108 illustrated in FIG. 1 are for illustrative purposes only, for the purpose of explaining and assisting one of ordinary skill in understanding the various embodiments described herein.

In accordance with the embodiment, the transceiver 110 coupled to the microcontroller 106 enables the electronic device 102 to transmit and receive the RF signals through an antenna (not shown). In accordance with the embodiment, the transceiver 110 converts the RF signals received from the antenna (not shown) to digital data for use by the microcontroller 106.

It is to be understood that FIG. 1 is for illustrative purposes only and is primarily for, although not solely for, explaining the information stored in memory for the various embodiments of an electronic device in accordance with the present disclosure, and is not intended to be a complete schematic diagram of the various components and connections there between required for an electronic device. Therefore, an electronic device will comprise various other components not shown in FIG. 1, and/or have various other configurations internal and external, and still be within the scope of the present disclosure.

Figure 2:
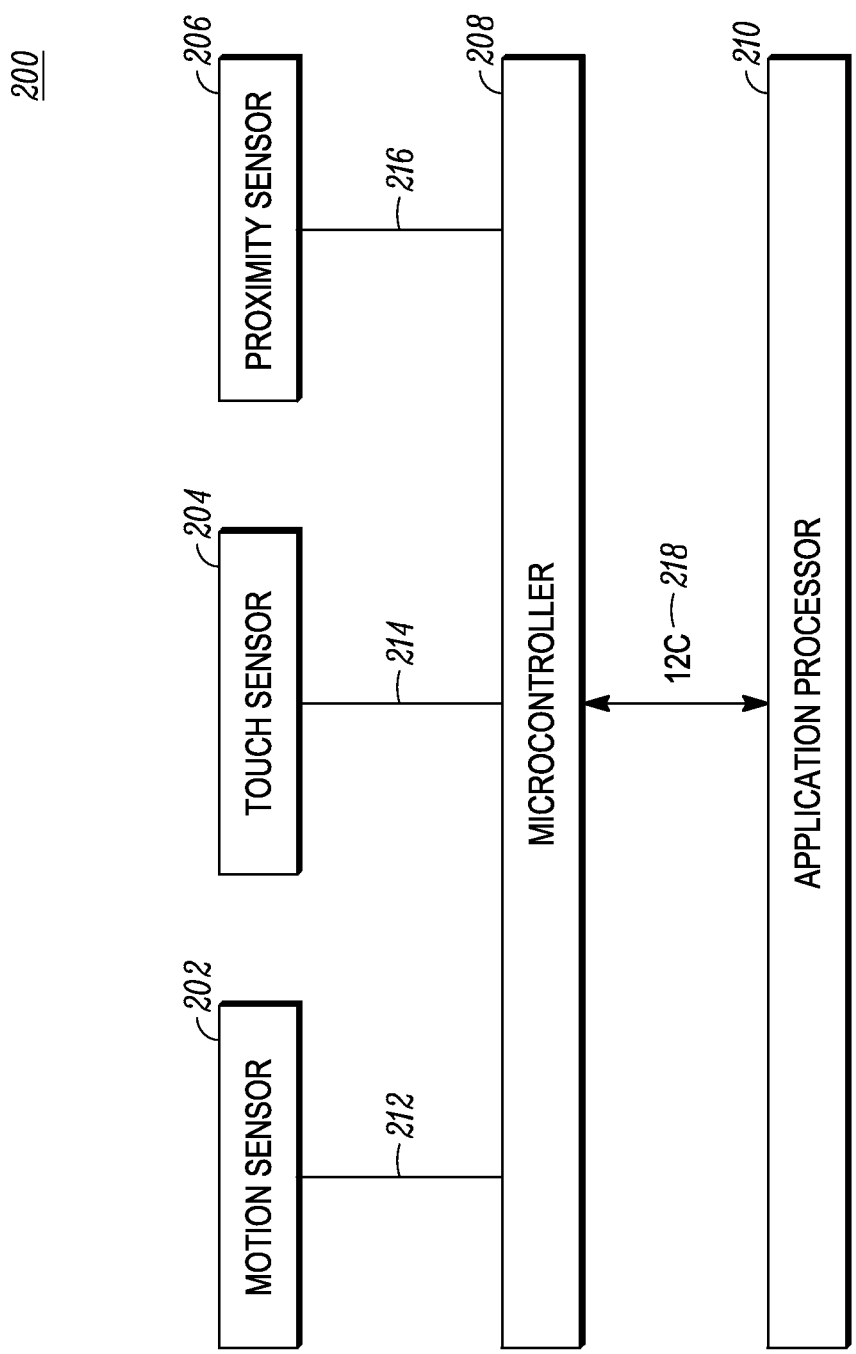
FIG. 2 is a schematic view of the electronic device in accordance with some embodiments.

FIG. 2 shows a schematic view of various components of an electronic device 102, or a portion of the components thereof The electronic device 102 may include a motion sensor 202, a touch sensor 204, a proximity sensor 206, a microcontroller 208, an application processor 210, electronic connectors 212, 214, 216, and an Inter-Integrated Circuit (I2C) bus 218.

The motion sensor 202 is a device that is sensitive to movement. For example, if a finger or a stylus is tapped over a display 104 of the electronic device 102 with some force, the motion sensor 202 detects the respective movement of the electronic device 102. In one example, the motion sensor 202 is an accelerometer that measures acceleration. More precisely, as soon as the motion sensor 202 detects an input, i.e., any movement of the electronic device, for example, a finger tap event, the motion sensor 202 turns on the touch sensor 204 which then monitors touch event on the display 104.

In one example, the motion sensor 202 interrupts the microcontroller 208 on receiving a motion input and the microcontroller 208 activates the touch sensor 204. Thus, the touch sensor 204 may be activated on receiving a command from the microcontroller 208, which receives the interrupt signal from the motion sensor 202 indicating that a motion event has occurred at the electronic device 104. In such a case, motion sensor 202 is connected to the touch sensor 204 via the microcontroller 208. In another example, the motion sensor 202 directly activates or turns on the touch sensor 204. In this case, the motion sensor 202 is directly connected to the touch sensor 204.

The proximity sensor 206 is a sensor that is able to detect the presence of nearby objects without any physical contact. The proximity sensor 206 emits an electromagnetic or electrostatic field, or a beam of electromagnetic radiation (infrared, for instance), and looks for changes in the field or return signal. The proximity sensor 206 may be used to prevent the display 104 from being activated or turned on if the electronic device 102 is in a pocket.

The motion sensor 202, the touch sensor 204, and the proximity sensor 206 are connected to the microcontroller 208 via the electronic connectors 212, 214, and 216 respectively. The microcontroller 208 serves as a sensor hub for the various sensors, for example, motion sensor 202, touch sensor 204, and the proximity sensor 206. When the motion sensor 202 detects a tap event, the microcontroller 208 turns on the touch sensor 204 and the proximity sensor 206 and begins storing data in the buffers (not shown) of the memory 108 of the electronic device 102. The memory 108 includes two buffers (not shown), a touch-data buffer and a proximity-data buffer. The touch-data buffer is used to store the data associated with the touch sensor 204 and the proximity-data buffer is used to store the data associated with proximity sensor 206.

The microcontroller 208 is also connected to the application processor 210 via an I2C bus 218. The I2C bus 218 is a bi-directional two-wire serial bus that provides a communication link between integrated circuits (ICs). For example, the I2C bus 218 provides a communication link between the microcontroller 208 and the application processor 210. The application processor 210 processes data received from the microcontroller 208 and performs basic functions related to the electronic device 102.

Operationally, when the motion sensor 202 detects a first tap input, the motion sensor 202 interrupts the microcontroller 208 via an electrical connector (not shown). The interrupt function may be implemented in a variety of ways. For example, the interrupt capability may be provided via one or more dedicated lines separate from the electronic connectors 212, 214, 216. In response to this, the microcontroller 208 activates the touch sensor 204 and proximity sensor 206 via the electrical connectors 214 and 216 respectively. In addition, the microcontroller 208 also instructs the touch data buffer and the proximity data buffer in the memory 108 to store data associated with the touch sensor 204 and the proximity sensor 206. The motion sensor 202 then detects a second tap input within a predetermined time after receiving the first tap input. In one example, the predetermined time is, but not limited to, 200-500 milliseconds.

On detecting the second tap input within the predetermined time from the first tap input, the microcontroller 208 reads the buffered data stored in the touch data buffer and the proximity data buffer. If the quantity of data stored in the touch data buffer is greater than a touch threshold value, and a quantity of data stored in the proximity data buffer is at or below a proximity threshold value, the microcontroller 208 activates a function of the electronic device 102. The touch threshold value is any predetermined value and, likewise, the proximity threshold value is any predetermined value. It should be noted that the touch and proximity sensors operate independently and, thus, their threshold values are independent as well. For example, either the touch threshold value or the proximity threshold value may be zero, one or two etc. The function of electronic device 102 is any function associated with the electronic device, for example, turning on the display screen 104, activating a particular application, making a phone call, reading an email, etc.

Thus, the microcontroller 208 depicts that the double tap received was a real double tap from finger and not an unintentional touch or false tap of random motion, and therefore the particular function of the electronic device 102 is activated. The real double tap refers to a genuine or accurate double tap which is not caused by an un-intentional touch or tap. Further, activating the function of the electronic device 102, the microcontroller 208 de-activates the touch sensor 204 and the proximity sensor 206 and waits for another input signal.

On the other hand, if the quantity of data stored in the touch data buffer is at or below the threshold value, it is assumed that there was no double tap received and the touch input or the tap event was a false event. Also, if the quantity of data stored in both the touch data buffer and the proximity data buffer is greater than a threshold, the microcontroller 208 does not activate a function of the electronic device 102 and it is assumed that there was no double tap received and the touch input or the tap event was a false event, e.g. when the electronic device is in pocket. In both the above cases, the function of the electronic device 102 is not activated and the microcontroller 208 de-activates the touch sensor 204 and the proximity sensor 206 and waits for another input signal.

Figure 3:
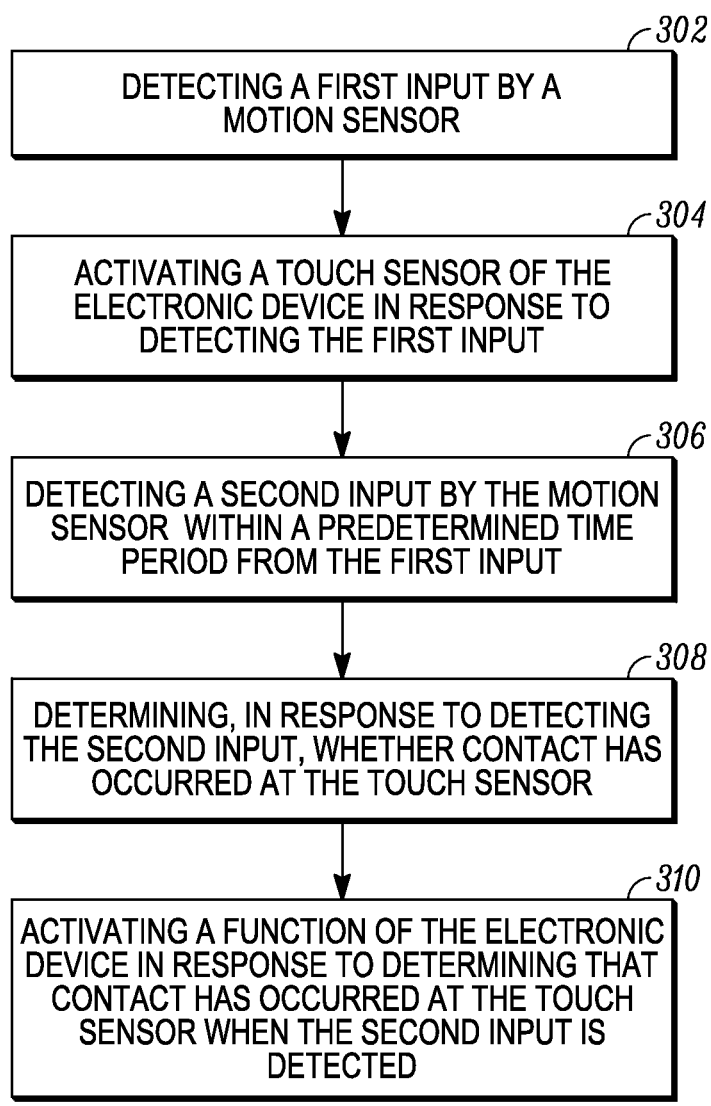
FIG. 3 is a flowchart of a method in accordance with some embodiments.

FIG. 3 is a flowchart for a method 300 for activating a function of an electronic device 102. Referring to FIG. 3, the method 300 begins with a step of detecting 302 a first input by a motion sensor 202. The motion sensor 202 is a device that is sensitive to movement. For example, if a finger or a stylus is tapped over a display 104 of the electronic device 102, the motion sensor 202 detects the respective movement of the electronic device 102. In one example, the motion sensor 202 is an accelerometer that measures acceleration. Further, the first input may be any form of motion input detected by the motion sensor 202 of the electronic device 102.

On detecting 302 the first input, the motion sensor 202 interrupts the microcontroller 208 via an electrical connector and signals the microcontroller 208 about the detected first input. The microcontroller 208 then activates 304 a touch sensor 204 of the electronic device 102. Further, the microcontroller 208 also activates a proximity sensor 206 of the electronic device 102 in response to detecting 302 the first input. The touch sensor 204 is associated with the display 104, i.e., the touch-sensitive screen of the electronic device 102. The proximity sensor 206 is a sensor that is able to detect the presence of nearby objects without any physical contact. The proximity sensor 206 emits an electromagnetic or electrostatic field, or a beam of electromagnetic radiation (infrared, for instance), and looks for changes in the field or return signal. The proximity sensor 206 is basically used to prevent the touch sensitive screen from being turned on if the electronic device 102 is in pocket.

In another embodiment, the motion sensor 202 is directly wired with the touch sensor 204 and the proximity sensor 206. In such a case, the motion sensor 202 directly activates the touch sensor 204 and the proximity sensor 206.

The method 300 then moves to a step of detecting 306 a second input by the motion sensor 202 within a predetermined time period from the first input. The second may be any form of input detected by the motion sensor 202 of the electronic device 102. For example, the second input may include a tap input. Further, the predetermined time period in one example is, but not limited to, 200-500 milliseconds.

On detecting 306 the second input within the predetermined time period from the first input, the motion sensor 202 again interrupts the microcontroller 208 via an electrical connector to indicate the detection of the second input. The method 300 then moves to a step of determining 308, by the microcontroller 208, in response to detecting 306 the second input by the motion sensor 202, whether a contact has occurred at the touch sensor 204. The microcontroller 208 also determines whether activity has occurred in proximity of the proximity sensor 206.

With respect to the touch sensor 204, the microcontroller 208 specifically determines if the contact has occurred at the touch sensor 204 since activating the touch sensor 204. The microcontroller 208 determines this by determining if a touch data buffer (not shown) associated with the touch sensor 204 indicates that the contact has occurred at the touch sensor 204. The touch data buffer is used to temporarily store data associated with the touch sensor 204. The microcontroller 208 determines whether a quantity of data stored by the touch data buffer is above a threshold value. In accordance with the embodiment, the threshold value is any predetermined value, for example, zero, one, two, etc. If the contact has occurred at the touch sensor 204, the quantity of data stored by the touch data buffer is above the threshold value. However, if no contact has been occurred at the touch sensor 204, the quantity of data stored by the touch data sensor is not above the threshold value.

Further, with respect to the proximity sensor 206, the microcontroller 208 determines whether activity has occurred in the proximity of the proximity sensor 206 or not. For this, the microcontroller 208 determines if a proximity data buffer associated with the proximity sensor 206 indicates that the activity has occurred in the proximity of the proximity sensor. More particularly, if the activity has occurred in the proximity of the proximity sensor, the quantity of data stored in the proximity data buffer is above a threshold value. For example, the threshold value is zero, one, two, etc. On the other hand, if no activity has occurred in the proximity of the proximity sensor 206, the quantity of data stored in the proximity data buffer is at or below threshold value.

Further, the method 300 activates 310 a function of the electronic device 102 in response to determining that the contact has occurred at the touch sensor 202 and no activity has occurred in the proximity of the proximity sensor 204. The function of electronic device 102 is any function associated with the electronic device, for example, turning on the display 104, activating a particular application, making a phone call, reading an email, etc. Therefore, the function of the electronic device 102 is activated in case the quantity of data stored by the touch data buffer is above the threshold value and the quantity of data stored in the proximity sensor is at or below the threshold value.

Thus, the function of the electronic device 102 is only activated after confirming that the detected first input and the second input is a real double tap and is not generated due to some false tap or un-intentional touch event. The real double tap refers to a genuine or accurate double tap which is not caused by an un-intentional touch or tap. Thus, the falsing can be eliminated to a great extent and the false detection of double tap due to vibrational motion is eliminated. In other words, one key advantage of the methods and apparatuses of this invention is to allow the electronic device 102 to differentiate between the occurrences of a light touch on the display 104, which can occur with very little physical contact force, and a real double tap on the display 104, which occurs with substantial mechanical force.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes and/or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for activating an electronic device, the method comprising:
   detecting, by a motion sensor, a first tap input;
   after detecting the first tap input, and responsive to detecting the first tap input, activating a touch sensor of the electronic device;
   within a predetermined time period after detecting the first tap input, detecting, by the motion sensor, a second tap input;
   after detecting the second tap input within the predetermined time period, and responsive to detecting the second tap input, determining whether contact has occurred at the touch sensor; and
   responsive to determining that the contact has occurred at the touch sensor, activating a function of the electronic device.

2. The method of claim 1, wherein the motion sensor is an accelerometer.

3. The method of claim 1, wherein the touch sensor is associated with a touch-sensitive screen of the electronic device.

4. The method of claim 1, wherein determining whether the contact has occurred at the touch sensor includes determining whether the contact has occurred at the touch sensor since activating the touch sensor in response to the first tap input.

5. The method of claim 1, further comprising:
   after detecting the first tap input, and responsive to detecting the first tap input, activating a proximity sensor of the electronic device; and
   after detecting the second tap input, and responsive to detecting the second tap input, determining whether the proximity sensor has detected activity,
   wherein activating the function of the electronic device includes activating the function of the electronic device in response to determining that the contact has occurred at the touch sensor and that the proximity sensor has not detected activity.

6. The method of claim 1, further comprising:
   responsive to detecting the first tap, outputting, by the motion sensor, an interrupt signal for activating the touch sensor, wherein activating the touch sensor is in response to receiving the interrupt signal.

7. The method of claim 1, wherein the predetermined time period is between two hundred and five hundred milliseconds, the method further comprising:
   responsive to determining that the second tap input has not been detected within the predetermined time period, refraining from activating the function of the electronic device.

8. A method for activating a function of an electronic device, the method comprising:
   detecting a first input by a motion sensor;
   activating a touch sensor of the electronic device in response to detecting the first input;
   detecting a second input by the motion sensor within a predetermined time period from the first input;
   determining, in response to detecting the second input, whether a touch data buffer associated with the touch sensor indicates that contact has occurred at the touch sensor, wherein the determining step includes determining whether a quantity of data stored by the buffer is above a threshold; and activating a function of the electronic device in response to determining that contact has occurred at the touch sensor when the second input is detected.

9. The method of claim 8, further comprising:

activating a function of the electronic device in response to determining that the quantity of data stored by the buffer is above the threshold.

10. An activation circuit for activating an electronic device, the activation circuit comprising:

a touch-sensitive screen;

a motion sensor for detecting a first tap input and a second tap input at the touch-sensitive screen, wherein the second tap input is detected within a predetermined time period from the first tap input;

a touch sensor; and a microcontroller, coupled to the motion sensor and the touch sensor, the microcontroller being configured to:

activate the touch sensor after the motion sensor detects the first tap input and responsive to the motion sensor detecting the first tap input, after the motion sensor detects the second tap input within the predetermined time period, and responsive to the motion sensor detecting the second tap input, determine whether contact has occurred at the touch sensor, and responsive to determining that the contact has occurred at the touch sensor, activate a function of the electronic device.

11. The activation circuit of claim 10, wherein the motion sensor is an accelerometer.

12. The activation circuit of claim 10, wherein the touch sensor is associated with the touch-sensitive screen of the electronic device.

13. The activation circuit of claim 10, wherein the microcontroller is further configured to activate the function of the electronic device in response to determining that the contact has occurred at the touch sensor since activating the touch sensor.

14. The activation circuit of claim 10, further comprising:

a proximity sensor, wherein the microcontroller is further configured to:

after the motion sensor detects the second tap, and responsive to the motion sensor detecting the second tap, determine whether the proximity sensor has detected activity, and responsive to determining that the contact has occurred at the touch sensor and that the proximity sensor has not detected activity, activate the function of the electronic device.

15. An activation circuit for activating an electronic device, the activation circuit comprising:

a touch-sensitive screen;

a motion sensor for detecting a first input and a second input at the touch-sensitive screen, wherein the second input is detected within a predetermined time period from the first input;

a touch sensor being activated in response to the motion sensor detecting the first input; and a microcontroller, coupled to the motion sensor and the touch sensor, comprising a touch data buffer associated with the touch sensor, wherein the microcontroller determines whether the touch data buffer indicates that contact has occurred at the touch sensor by determining whether a quantity of data stored by the touch data buffer is above a threshold, and wherein the microcontroller activates a function of the electronic device when the second input is detected.

16. The activation circuit of claim 15, wherein the microcontroller is further configured to activate a function of the electronic device in response to determining that the quantity of data stored by the touch data buffer is above the threshold.

* * * * *